May 22, 1934.   W. F. ARTRIP   1,959,560
POTATO PLANTER
Filed March 28, 1932   5 Sheets-Sheet 1
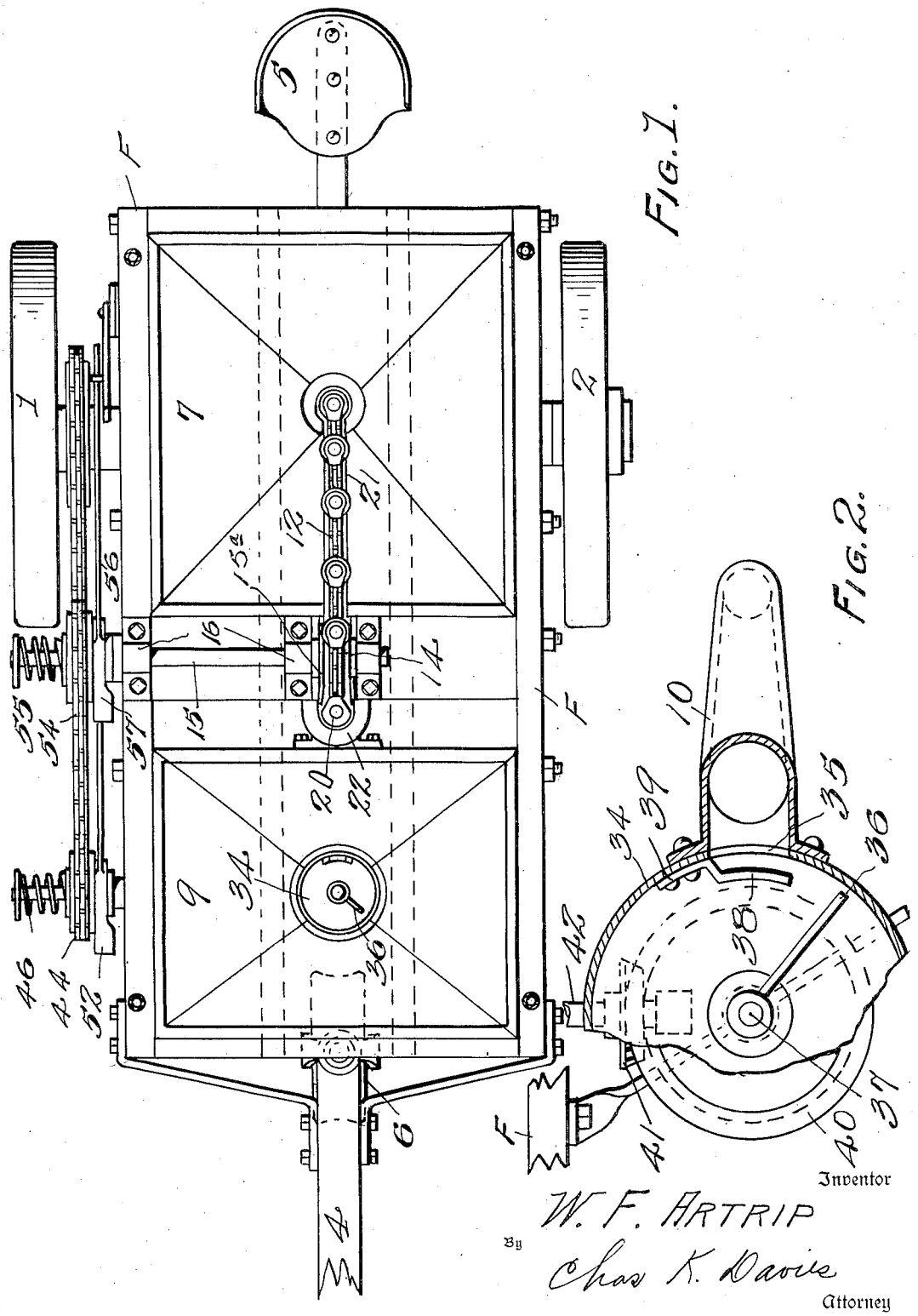

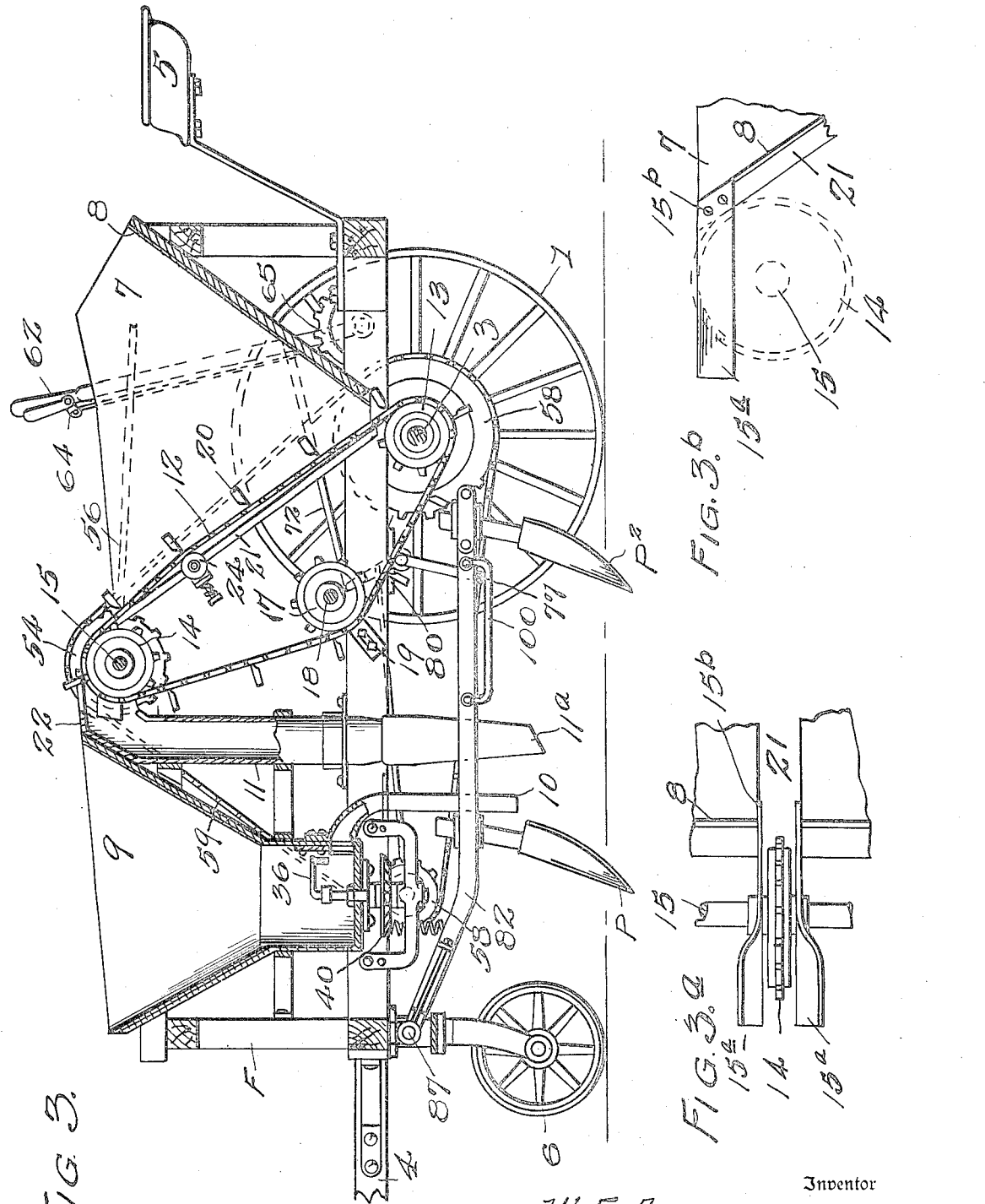

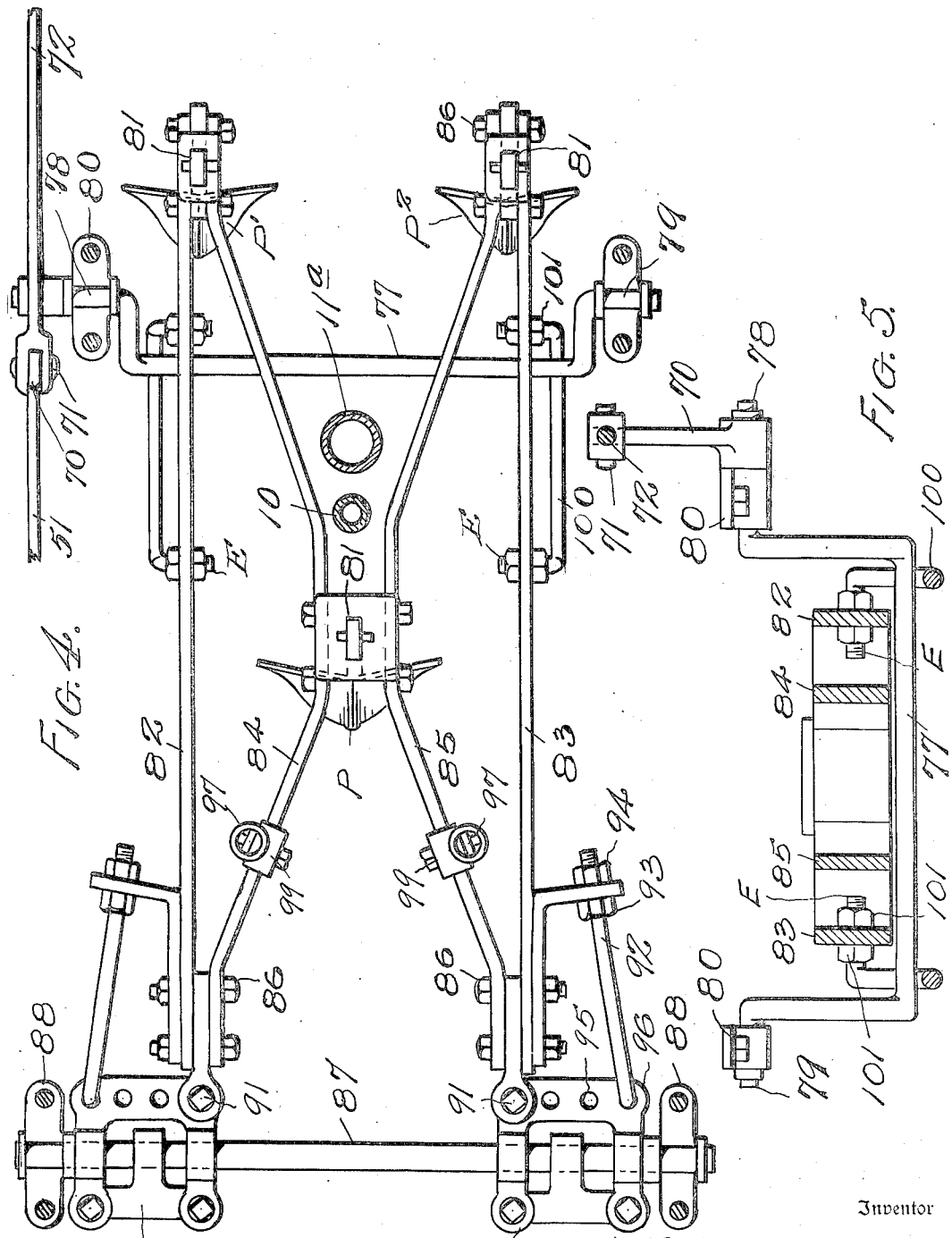

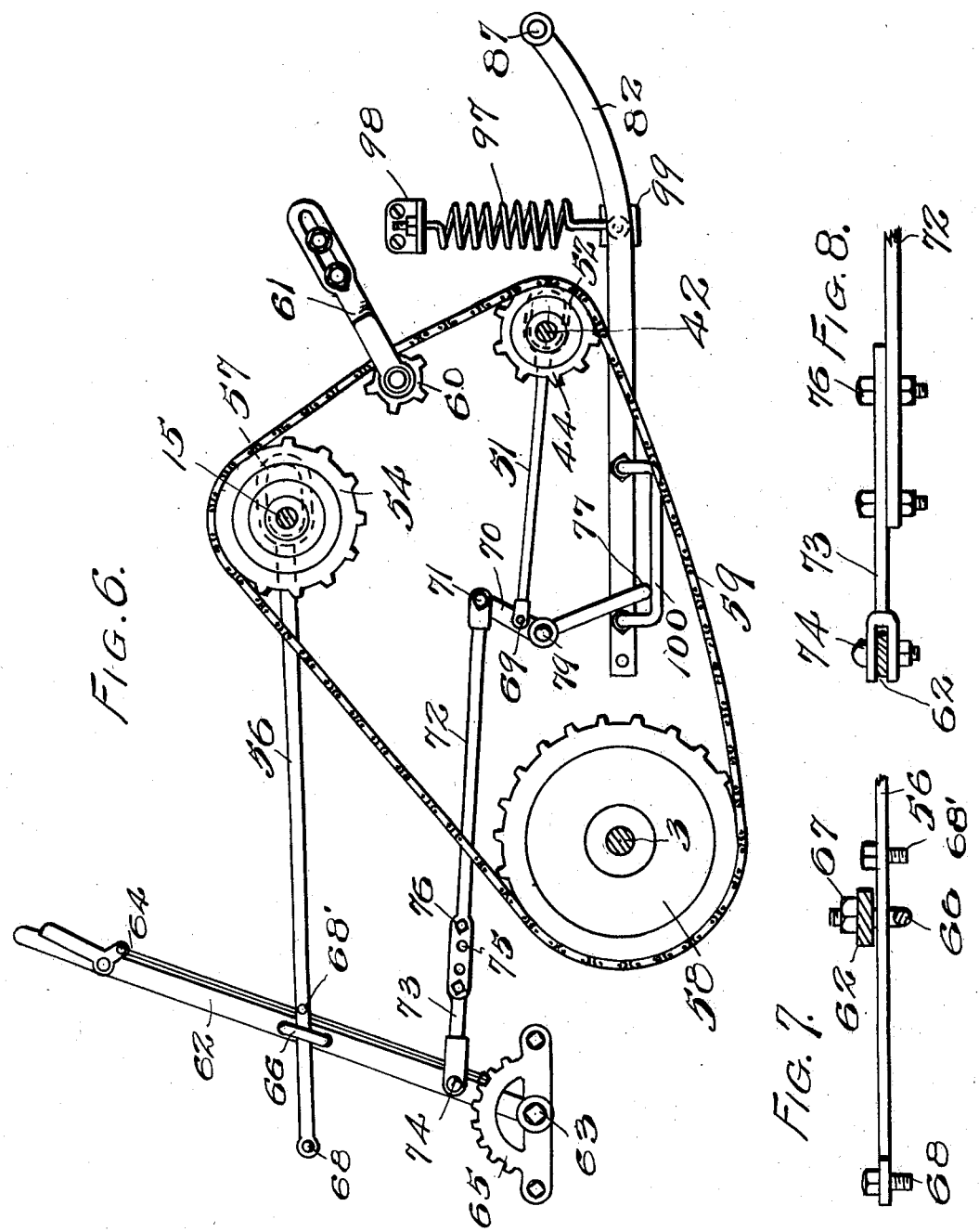

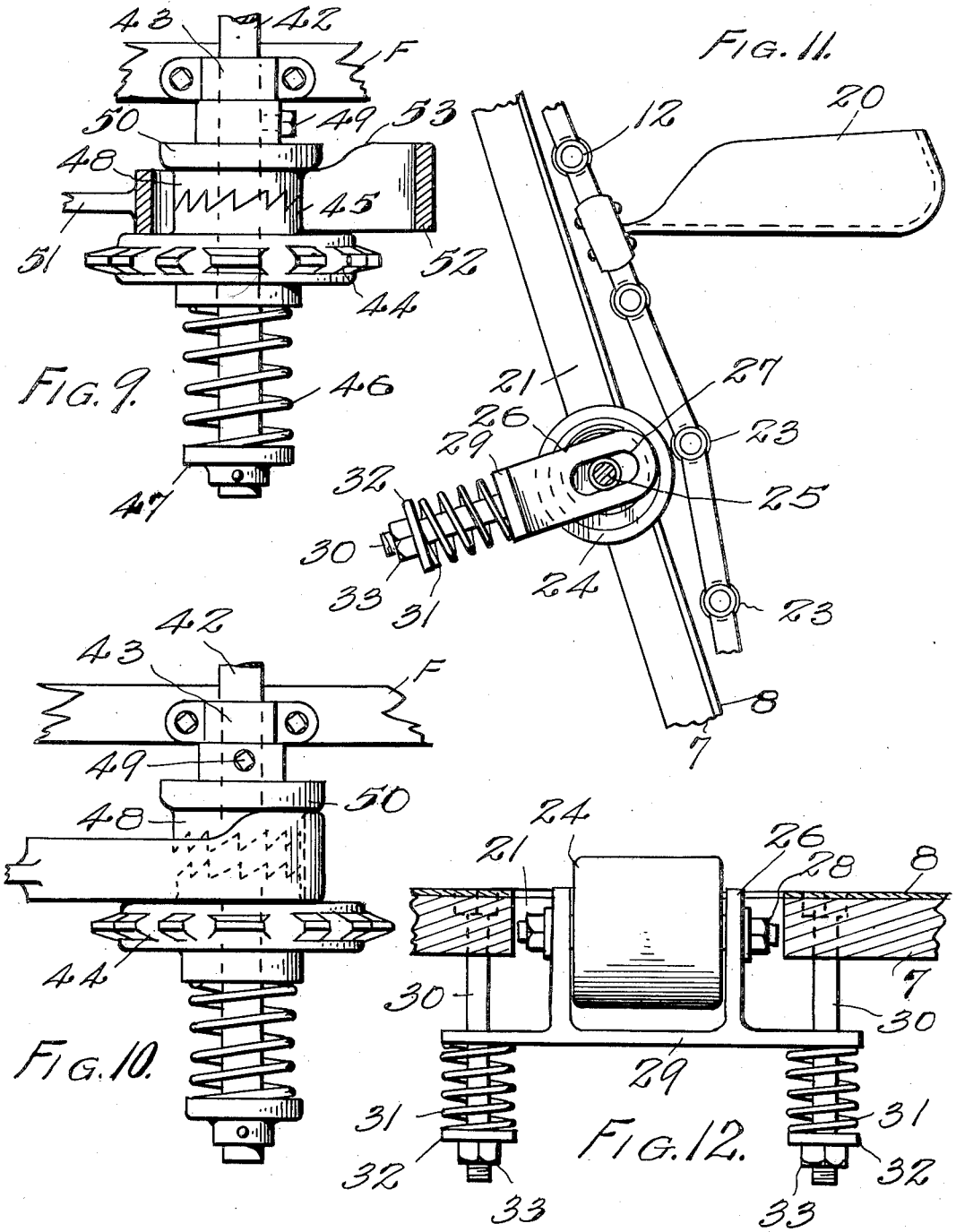

Patented May 22, 1934

1,959,560

UNITED STATES PATENT OFFICE 1,959,560

POTATO PLANTER

William F. Artrip, Winchester, Va., assignor of one-half to John W. Morgan, Riverton, Va.

Application March 28, 1932, Serial No. 601,656

6 Claims. (Cl. 221—135)

My present invention relates to improvements in potato planters of the traction operated type employing an endless chain elevator for conveying the potatoes to the feed chute, in combination with a fertilizer distributer, and the required plows for opening and closing the furrow. While I shall hereinafter refer to the implement as a potato planter, and describe the operation of planting potatoes, it will be understood that other planting operations may be accomplished by the implement where a plow is utilized to open the furrow, fertilizer and the seed are deposited in the opened furrow, and then the furrow is closed by the following plows.

The primary object of my invention is the provision of an agricultural implement of this type which is reliable and efficient in planting the seet-potatoes at the required, spaced, intervals in the furrow or hill, and to this end the several parts of the implement are compactly arranged and the operation of these several parts are placed under control of a single hand lever that is located in position to be readily accessible to the driver of the horse-drawn implement. By the manipulation of the single control lever, the operation of the endless conveyer of the planter, and of the fertilizer distributer are controlled, and the location of the plows is simultaneously governed. Thus, when required, as for instance when making a turn at the end of a row, the lever is used to throw out of gear and render inoperative the feed chain for the potatoes, and the fertilizer distributer, and at the same time elevate the plows to inoperative position. Clutch devices are employed in combination with the feed chain for the potatoes and the driving means of the fertilizer distributer, and means are combined with the plow frame whereby the latter is not only elevated to remove the plows from the soil, but by means of which the plows are held to their proper positions beneath the surface of the soil and prevented from accidentally rising out of the soil.

To insure the depositing or planting of single seed potatoes at regular spaced intervals, means are provided in connection with the feed chain whereby excess potatoes are eliminated from the chain before the seed-potato is deposited in the feed chute, and of course the distance between the planted seed potatoes may be varied as desired or required.

My invention consists in certain novel devices, combination and arrangements of parts whereby simplicity in construction, and simplicity and convenience in operation of the implement are assured, as will hereinafter be more fully set forth and claimed. In the accompanying drawings I have illustrated one complete example of the physical embodiment of my invention wherein the parts are combined and arranged according to the best mode I have thus far devised for the practical application of the principles of my invention, but it will be understood that various changes and alterations are contemplated, and may be made, within the scope of my appended claims without departing from the principles of my invention.

Figure 1 is a top plan view of the potato planter embodying my invention. Figure 2 is an enlarged detail sectional view of part of the fertilizer distributer, and its driving means. Figure 3 is a longitudinal, vertical sectional view of the potato planter, with parts in side elevation, and the plows in position for use.

Figure 3a is a detail, top plan view, enlarged, at the top of the slotted potato hopper, showing the pair of fenders or guides for the seed potatoes as they leave their carrier-cups and pass to the feed chute. Figure 3b is a detail face view of one of the fenders, showing its attachment to a wall of the slot of the potato hopper. Figure 4 is a top plan view showing the pivoted plow-frame and plows, and lifting means therefor. Figure 5 is a detail sectional view, transversely of the plow frame, showing the crank-shaft for elevating and lowering the plow-frame.

Figure 6 is a detail side view showing the driving mechanism of the planter and the fertilizer distributer, and the single control lever with connections therefrom.

Figure 7 is a detail view showing the connection of the clutch-link to the shaft of the potato feeding mechanism, and the control lever.

Figure 8 is a detail view of the adjustable link between the control lever and the plow lifting mechanism.

Figure 9 is a detail view, partly in section, of one of the driving clutches, in closed position; and Figure 10 shows the clutch in open position, or disengaged. Figure 11 is a detail view showing part of the feed chain, and its agitating roller to dislodge excess potatoes from the chain. Figure 12 is a sectional view of part of the slotted wall of the potato hopper, showing the mount for the agitating roller.

In the physical embodiment of my invention I have illustrated the implement as adapted to be drawn by a team of horses, and provided with a pair of traction wheels 1 and 2 journaled on the axle 3 that extends transversely of the frame F near the rear end of the implement, and properly supporting the implement. A draft tongue 4 is indicated at the front of the implement, and the usual seat 5 is supported at the rear of the planter for the accommodation of the driver. A swivel wheel 6, having a concave periphery, is journaled in suitable manner at the front and longitudinal center line of the planter for supporting the front portion of the planter and also for packing the soil in front of the front, centrally located, furrow-opening plow P, in order that the latter may properly form the furrow in which the potatoes are to be planted.

The seed-potatoes, in suitable quantity, are carried in the hopper 7, which preferably is fashioned with a lining as 8, of metal or other suitable material and the hopper, which is supported at the rear end of the implement in the main frame F, has a formation which tapers from the open, wide top, to the narrow bottom, as indicated in Figures 1 and 3, in order that the seed-potatoes may be lifted and conveyed to the upper part of the hopper, as will be described.

A fertilizer hopper is also mounted, in the main frame, and indicated as 9, at the front of the implement, and the fertilizer chute or tube 10 is alined with the potato chute 11 and its tubular extension 11a, directly back of the furrow opening plow P.

A suitable distance at the rear of the furrow-opening plow P are located a pair of laterally spaced covering plows P¹ and P², and it will be understood that the fertilizer is deposited in the furrow opened by the plow P, after which the seed potato is dropped into the furrow, and the two laterally spaced plows P¹ and P², as they advance with the implement, cover up the planted potato, and form the hill, in usual manner.

The seed-potatoes are elevated and conveyed from the hopper 7 through the use of an endless sprocket chain 12 which passes over a sprocket wheel 13, loose on the axle 3 of the implement and located directly below the open bottom of the hopper 7, thence over a drive sprocket 14 on the transverse shaft 15 journaled in bearings 16 at the top and front of the hopper 7. A guide sprocket 17 is also employed in connection with the conveyer chain, and journaled on the shaft 18, which is adjustable in bracket 19. The bracket 19 is suitably supported on a part of the main frame, or other support, and the guide sprocket wheel 17 is adjustable to tighten the endless sprocket chain.

At regular, spaced intervals, the conveyer chain or elevator is provided with carriers or cups 20, of suitable shape, to pick up and carry a seed-potato, and these cups are attached to the chain or to the links of the chain so that they will be in position to successively pick up the seed potatoes, as the cups pass around the wheel 13 and enter the pointed, open end of the tapered hopper, which hopper, as indicated, is slotted as at 21 to accommodate the chain. As best seen in Figure 3 the potatoes are carried by the cups to the top of the hopper, and the single potatoes are successively dropped by the cups into a hood 22 at the top of the chute 11, and the potatoes fall, at intervals, by gravity, through the chute 11 and its extension 11a. The extension is of suitable size and shape to guide the seed potatoes, and its lower, outlet end, terminates in proper position to deposit the seed potatoes in the furrow provided therefor by the opening plow.

As the seed potatoes are elevated by the endless chain, and after they have passed over the sprocket 14 at the top of the hopper 7, in order that they may be guided to proper position so that they will fall by gravity through the chute 11, I provide a pair of guides, or fenders, as 15a. These guides or fenders are preferably fashioned from resilient metal that is flexible, as for instance sheet metal, and they are of generally rectangular shape with their outer, free ends flaring slightly outwardly toward their top edges. The flat ends of these sheet metal plates are attached, as at 15b, to side walls of the slot 21 of the potato hopper 7, as best seen in Figure 3b.

Thus it will be apparent that as the carrier-cup 20 passes over the wheel or sprocket 14, the seed potato is emptied therefrom and falls between the flaring guides 15b, and as these guides converge toward their bottom edges, the seed potato is guided by the metal plates, in its movement through the hood of the chute, and consequently the seed potato is dropped directly through the chute, for deposit in the ground.

In order to prevent a cup from carrying more than one seed potato to the hood of the chute, I provide agitating means to cooperate with the joints 23, or other parts of the chain, for agitating the upwardly moving flight of the conveyer chain, as indicated in Figure 11, whereby excess potatoes are shaken from a cup or cups. Thus, each cup is fashioned of the proper size and shape to accommodate a single seed potato, but should one, or more, additional potatoes lodge on a seed potato carried by a cup, the potato or potatoes may be dislodged, and prevented from entering the hood of the feed chute.

To shake or agitate the chain, I place a roller 24 in the path of the sprocket chain, as indicated in Figure 11, and as the links of the upwardly moving, or working flight, of the chain bump over the agitating roller or sprocket, the chain is shaken to dislodge all potatoes, except the single potato that is to be carried to the hood by each cup.

This agitating roller is located in or adjacent to the slot 21 of the hopper, and its shaft 25 is journaled in brackets 26, which are slotted at 27 to accommodate the shaft ends, and clamp nuts 28 on the ends of the shaft are utilized to clamp the roller shaft in adjusted position in the slotted brackets. The supporting means for the roller may be constructed in any suitable manner, and I have shown the slotted brackets integral with a cross plate 29 that is loosely supported on bolts 30 secured in the wall of the hopper. As best seen in Figure 12, springs 31 are interposed between plate 29 and washers 32 on the bolts. Nuts 33 on the bolts retain the washers in position to anchor the springs, and the nuts may be turned to vary the tension of the springs and adjust the roller to project it more or less into the path of the elevator or conveyer chain.

The springs provide a more or less resilient support for the roller, and while the weight of the chain tends to push the roller out of the path of the chain, the springs, acting in the opposite direction, provide resilient means for urging the roller back into the path of the chain. Thus, as the joints or other projecting parts of the chain bump against, and over, the roller, the chain is agitated, and any potatoes, not retained in the cups by their side walls, are dislodged from the cups and fall back into the supply in the hopper.

A quantity of fertilizer, in powder form, is dropped into the furrow, ahead of the planted potatoes, through the chute 10, and as shown in Figures 1, 2, and 3, the chute 10 is attached to a cylindrical drum 34, of metal that is attached to the lower part of the fertilizer hopper 9, and provided with an outlet port or opening 35 to establish communcaton between the drum and the chute.

To prevent the fertilizer from clogging or compacting in the bottom of the drum, and to insure an easy flow of the material through the outlet port or opening 35, I provide a rotary stirrer or agitator comprising a laterally extending arm 36 mounted on the vertical shaft 37 that passes upwardly, from below, through the bottom of the drum. In front of the lateral hole or port 35 a plate 38 is attached to the inner face of the wall of the drum at 39, to form a shield that prevents feed of excess material through the outlet port, and this plate as indicated is vertically arranged and spaced a slight distance from the port.

The vertical stirrer-shaft 37 is revolved through the use of a bevel gear 40 fixed to revolve with the shaft below the bottom of the drum, and the shaft is journaled to revolve in suitable bearings. The large bevel gear 40 is revolved by a smaller bevel pinion 41 on the driving shaft 42, which is journaled in proper bearings as 43 and extends transversely of the implement, with one of its ends projecting at the side of the implement, as indicated in Figure 1, where it will also be seen that the drivng shaft 15 of the conveyer chain 12 projects laterally of the implement.

On the projecting ends of these two shafts are located driving and clutch devices, and means are provided for simultaneously engaging and disengaging the clutches of the two shafts for operating the potato conveyer and the fertilizer, as well as for rendering these essential parts inoperative. The two clutch devices are similar in construction and operation, and a detailed description of one will suffice for both.

In Figures 9 and 10 detailed illustrations are shown of the driving and clutch device of the stirrer for the fertilizer distributer, and it will be seen that shaft 42 is provided with a loose, slidable sprocket wheel 44 having a clutch member 45, and a spring 46 is coiled about the shaft at the outer side of the sprocket and interposed between the sprocket and a collar 47 fixed at the end of the shaft. A complementary, fixed, clutch member 48 is secured on the shaft by set bolt 49, and this member is fashioned with a circular flange 50. A clutch link 51 is fashioned with a loop 52 at its end of sufficient size and shape to enclose the clutch members and slide thereon, and the edge of one wall of the loop is fashioned with compound curves 53 forming cams. The loop as shown loosely encloses the clutch members and is interposed between the sprocket wheel 44 and the annular flange 50, so that a push on the link 51 frees the cam faces 53 from the flange 50, and permits the spring 46 to engage the clutch, as seen in Figure 9. A pull on the link 51 causes the cam faces 53 to ride across the flange 50 of the clutch member 48 and across the face of the sprocket wheel 44, thereby forcing the wheel 44 toward the end of the shaft 42, and against the tension of the spring 46, to open or disengage the clutch.

In Figure 1 the drive sprocket 54 on the shaft 15 is provided with a clutch device 55 similar to that of the shaft 42, and the link 56 is provided with a cam loop 57, by means of which the clutch is engaged and disengaged, similar to the clutch device of Figures 9 and 10.

In addition to the two sprocket wheels 44 and 55, I employ a main driving sprocket wheel 58 rotatable with and mounted on the transverse shaft or axle 3 of the implement, and this main sprocket wheel is utilized as the source of power for operating or driving the fertilizer distributer and the potato planter, through the driving sprocket chain 59 which passes over these three sprocket wheels. A tightener for the drive chain is provided by the use of an idle sprocket wheel 60, engaging the chain, and having a journal bearing in the adjustable bracket 61, which bracket is supported in suitable manner on the main frame or upon any other suitable part of the implement.

The two clutch mechanisms described, the fertilizer distributer and the conveyer chain or elevator for the potatoes, as well as the position of the three plows, are all controlled by means of the single hand lever 62 which is pivoted at 63 at one side of the implement where it is readily accessible for use by the driver who occupies the seat 5. The lever is provided with the usual ratchet device 64, and toothed segment 65, and as best seen in Figures 6 and 7, the lever is provided with a U-bolt 66 secured by nuts 67 to provide a holder for the clutch-link 56 of the clutch for shaft 15. As shown, the link passes through this loop or holder, and the link is provided, at the opposite sides of the lever, with two spaced, transversely extending stop bolts or abutments 68 and 68' which control the movement of the link.

By the initial movement of the lever 62, to the left in Figure 6, the plows P, P¹, and P² are lifted from the soil, as will be described, but the action of the lever on the link 56 is delayed, by the connection between the link and lever, until near the end of the movement of the lever. Thus, the clutch 45—48 is disengaged near the end of the stroke of the lever, when the holder or loop 66 contacts with the abutment or bolt 68, and continued movement of the lever at this time pulls on the link 56 to open the clutch.

When the lever is locked or latched in its rearmost position, it will be evident that the clutches are thus held out of engagement, and even though the drive chain 59 is operated by movement of the advancing implement, neither the potato feeder nor the fertilizer distributer is operated.

The clutch link 51, as seen in Figure 6, is pivoted at 69 to a lever arm 70, and at 71 the end of this lever arm is pivoted to an adjustable, sectional, connecting link, which comprises two sections 72 and 73, and the latter section has a pivotal connection at 74 to the control or operating lever 62. The overlapping ends of the sections 72 and 73 are provided with series of boltholes 75, and the bolts 76 are employed to fasten together the two sections, to vary the length of the connecting link, as shown in Figures 6 and 8.

The short lever arm 70 is rigid with a crank shaft fashioned with a U-shaped lifting crank 77, and journal ends 78 and 79, Figs. 4 and 5, the latter being supported in the bearings 80 attached at the under side of the main frame F. The lever arm 70, as shown, is disposed at an angle to the U-crank, and the crank shaft is adapted to be turned in its bearings to either lift the plows or shovels P. P¹ and P² out of the soil, or to plunge them into the soil and hold them in position to cut the furrow and to close the furrow, respectively.

The plows or shovels may be of any suitable type for the purpose desired, and they are herewith shown as including upright shanks 81 together with appropriate means for mounting the shanks in the plow frame, which latter is horizontally disposed beneath the main frame of the implement at the opposite sides of the longitudinal center line of the implement.

The plow frame as to its main elements comprises two outer parallel side bars 82 and 83, and two intermediate, angular brace bars 84 and 85, clamp bolts 86 being employed where necessary for rigidly joining the ends of adjacent bars and for securing the shanks of the plows or shovels in the plow frame.

At the forward or front end of the implement, the horizontally disposed and longitudinally extending plow frame is pivoted on a bar 87, which bar, at its ends is provided with supporting brackets 88 bolted at the underside of the main frame F of the implement, and spaced pivot-yokes 89 and 90, rigid with the plow frame, are employed as hangers to pivotally support the front end of the frame on the pivot bar. The plow frame is connected to the hangers by means of bolts as 91, and tie bolts 92, the latter being anchored by nuts 93 to the brackets 94 fastened to the side bars of the plow frame, and these tie bolts, at their front ends are anchored in holes 95 of the plate 96, forming part of the respective hangers for the plow frame. As best seen in Figure 3 the front end of the plow frame inclines upwardly to its pivotal support, and the two hangers provide a wide bearing for the opposite sides of the plow frame in order that it may rigidly be held in either its uplifted position or its lowered position, by the use of the crank shaft.

A pair of springs as 97, 97, are anchored at their upper ends to brackets 98 fixed to the main frame or other support, and at their lower ends these springs are anchored, as at 99 to the intermediate brace bars 84 and 85 of the plow frame, to assist in lifting or elevating the plow frame, as best seen in Figure 6.

As best seen in Figures 4 and 5, the U-shaped lifting yoke 77 of the crank shaft engages the under edges of the four bars 82, 83, 84, and 85 of the plow frame, to lift the frame, and to receive the force applied to plunge the plows into the soil I employ a pair of depressed bars 100, that have their angular ends E, threaded and passed through holes in the side bars 82 and 83, and lock nuts 101 are employed at each side of the side bars to lock the depressed bars in place. As shown in Figure 5 the bars 100 are spaced below the lower edges of the side bars and the cross bar of the yoke 77 passes beneath the side bars and over or across the depressed bars. The depressed bars, in combination with the respective side bars, provide slots of sufficient length to permit the passage of the cross bar of the yoke 77 as it swings upwardly or downwardly on the journals 78 and 79, and it will be apparent that the yoke engages the bars 82, 83, 84, 85, to lift the frame, and that the yoke engages the bars 100 to depress the plow frame and to hold the plows or shovels in position for opening and closing the furrow.

From the above description taken in connection with my drawings, it will be evident that I have provided an implement of this character which is extremely compact in the arrangement of its parts, simple in construction, and which requires the attention of only one person during potato-planting operations. Thus the driver, who occupies the seat 5, is in position for readily controlling the action of the two clutches, and the position of the plows, simultaneously, by use of the control lever 62, and without necessity for assistance, in the form of manual labor, from the boy or man who usually accompanies the implements now in use for planting potatoes.

By a simple push on the lever 62, the clutches are caused to be engaged for operation of the fertilizer distributer and for operation of the conveyer chain for the potatoes, and simultaneously the plows are forced down into the soil the proper depth for accomplishing the planting of the seed potatoes. Similarly, by a pull on the lever 62, the clutches are disengaged to render inoperative the potato conveyer and the fertilizer distributer, and to lift the plows from the soil.

After the plows have been lowered to operative position through the movement of the lever 62, the latter is locked or latched to hold the plows in their depressed, operative position, and the plows cannot be lifted from this position, except by operation of the control lever.

While I have shown one complete embodiment of my invention, it will be understood that changes and alterations may be made in this exemplifying structure to adapt the implement for various different purposes. For instance, the number of carrying-cups 20 on the endless chain conveyer may be increased, or diminished, and the dimensions of the operating parts may be varied by changing the sizes of sprocket wheels to vary the ratio of the driving mechanism.

The plow frame, or the plows, may be laterally adjusted, as indicated in Figure 4, by use of the bolts 92, nuts 94, 93, and the plates or links 96, and the plows may be adjusted to desired positions longitudinally of the implement, as well as vertically, with relation to the depth to which they are to penetrate the soil.

Changes and alterations are contemplated, and may be made, in other parts of the implement, within the scope of my appended claims, without departing from the principles of my invention.

Having thus fully described my invention, what I claim as new and desire to secure by Letters Patent is:

1. In a potato planter having a slot in one of its walls, an endless chain conveyer having its working flight passing upwardly through the hopper adjacent the slot, carrying cups on said conveyer, and means for operating the conveyer, of an agitating roller journaled in bearings on the hopper and located in said slot in the path of movement of and supporting said working flight of the conveyer.

2. In a potato planter, the combination with a hopper having an inclined wall and a slot in said wall, a rotary bumper and bearing supports for said bumper mounted on said wall, said bumper located in said slot and projecting therethrough to the inside of the hopper, of an endless chain conveyer having its working flight passing upwardly through said hopper adjacent the slot and supported on said bumper, and means for operating the conveyer.

3. In a potato planter, the combination with a hopper having an inclined wall and a slot therein, of an endless chain conveyer having an inclined working flight passing upwardly through said hopper adjacent its slot, means for operating the conveyer, and carrying-cups on said conveyer, a bumping-roller projecting through the slot and located in the path of the inclined working flight, and a journal-bearing-support for said bumping-roller mounted on the inclined wall of the hopper.

4. In a potato planter, the combination with a hopper having a slotted inclined wall, an endless chain conveyer having a working flight traveling substantially parallel with said slotted wall, carrying-cups on said conveyer, and means for operating the conveyer, of a bumping-roller located in the slotted wall and projecting into the path of the working flight, a bracket extending transversely of the slotted wall, journal bearings in said bracket for the roller, a support for the bracket, and resilient means co-acting with the bracket for urging the roller in contact with the working flight.

5. In a potato planter, the combination with a hopper having a slotted inclined wall, an endless chain conveyer having a working flight traveling substantially parallel with said slotted wall, carrying cups on said conveyer, and means for operating the conveyer, of a bumping-roller located in the slotted wall and projecting into the path of the working flight, a slotted bracket forming journal bearings for the roller, a pair of spaced bolts rigid with the slotted wall and supporting said bracket, springs on the bolts bearing against said bracket, and retaining nuts on the bolts for adjusting the tension of the springs.

6. In a potato planter, the combination with a hopper having four inwardly inclined walls converging to an open bottom and one of said walls having a slot therein, an endless chain conveyer having its working flight traveling substantially parallel with said slot, carrying-cups on said conveyer, and means for operating the conveyer, of agitating means projecting through said slot in contact with and supporting said working flight, resilient means for urging said agitating means into contact with the working flight, a discharge chute having a hood adjacent the upper end of the conveyer, and means for guiding the potatoes from said conveyer through said hood to the chute.

WILLIAM F. ARTRIP.